United States Patent
Cho et al.

(10) Patent No.: US 10,819,138 B2
(45) Date of Patent: Oct. 27, 2020

(54) CONTROL METHOD AND CONTROL SYSTEM FOR ENERGY STORAGE SYSTEM HAVING DEMAND CONTROL AND UNINTERRUPTED POWER SUPPLY FUNCTIONS

(71) Applicant: KOREA ELECTRIC POWER CORPORATION, Naju-si (KR)

(72) Inventors: Sung-Min Cho, Daejeon (KR); Ji-Hoon Im, Seongnam-si (KR); Sung-Eun Lee, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 86 days.

(21) Appl. No.: 16/334,720

(22) PCT Filed: Nov. 14, 2016

(86) PCT No.: PCT/KR2016/013071
§ 371 (c)(1),
(2) Date: Mar. 19, 2019

(87) PCT Pub. No.: WO2018/056505
PCT Pub. Date: Mar. 29, 2018

(65) Prior Publication Data
US 2019/0267809 A1    Aug. 29, 2019

(30) Foreign Application Priority Data
Sep. 26, 2016   (KR) .................. 10-2016-0123432

(51) Int. Cl.
*H02J 3/28* (2006.01)
*H02J 9/06* (2006.01)
(Continued)

(52) U.S. Cl.
CPC .............. *H02J 9/06* (2013.01); *H02J 3/28* (2013.01); *H02J 7/0068* (2013.01); *H02J 3/003* (2020.01)

(58) Field of Classification Search
CPC .. H02J 3/003; H02J 3/28; H02J 7/0068; H02J 9/06
(Continued)

(56) References Cited

U.S. PATENT DOCUMENTS

2007/0080666 A1    4/2007  Ritter et al.
2007/0213876 A1*   9/2007  Warren .............. G05D 23/1924
                                                    700/276
(Continued)

FOREIGN PATENT DOCUMENTS

JP        2016-116401 A    6/2016
KR        10-1322617 B1    10/2013
(Continued)

*Primary Examiner* — William Hernandez
(74) *Attorney, Agent, or Firm* — Foundation Law Group, LLP

(57) ABSTRACT

A control method and/or an apparatus for an energy storage system having demand control and uninterrupted power supply (UPS) functions and an associated control system is provided. The control method for the energy storage system may include: an operation plan establishment step of predicting power to be consumed in a load, so as to estimate the capacity of energy (UPS capacity) which needs to be charged in the energy storage system in order to provide uninterrupted power supply when a power failure occurs, and the capacity of energy available for demand control; an energy storage system operation step of operating the energy storage system according to an operation plan established in the operation plan establishment step; and a step of re-establishing an operation plan according to an operation state of the energy storage system operated by the energy storage system operation step.

24 Claims, 10 Drawing Sheets

(51) Int. Cl.
*H02J 7/00* (2006.01)
*H02J 3/00* (2006.01)

(58) Field of Classification Search
USPC .................................................. 307/23, 150
See application file for complete search history.

(56) References Cited

U.S. PATENT DOCUMENTS

2016/0197519 A1   7/2016  Carter et al.
2016/0224088 A1   8/2016  Nguyen et al.

FOREIGN PATENT DOCUMENTS

| KR | 10-1445738 B1 | 11/2014 |
| KR | 10-2015-0098120 A | 8/2015 |
| KR | 10-2016-0028880 A | 3/2016 |

* cited by examiner

CONTROL METHOD AND CONTROL SYSTEM FOR ENERGY STORAGE SYSTEM HAVING DEMAND CONTROL AND UNINTERRUPTED POWER SUPPLY FUNCTIONS

CROSS-REFERENCE TO RELATED APPLICATION

This application claims the benefit under 35 U.S.C. Section 371, of PCT International Application No. PCT/KR2016/013071, filed on Nov. 14, 2016, which claimed priority to Korean Patent Application No. KR 10-2016-0123432, filed on Sep. 26, 2016, the disclosures of which are hereby incorporated by the references.

TECHNICAL FIELD

The present invention relates to a control method and a control system for an energy storage system having a demand control function as well as an uninterrupted power supply function.

BACKGROUND ART

An energy storage system (hereinafter, referred to as an ESS) is a facility for charging electrical energy and discharging energy at a required point of time to make power use flexible.

Storage of electrical energy varies with technologies such as battery technology, which converts energy into electrochemical energy, and a flywheel, which stores energy as physical energy.

The most common use of ESS is for uninterrupted power supply (UPS) against power outage and demand control for peak load reduction and power rate reduction of the load.

FIG. 1 shows a structure of an ESS capable of simultaneously performing such demand control and UPS functions.

The ESS installed for the purpose of the UPS function is in a charged state and remains in standby until a power failure occurs in the state of charge, so the frequency of use of the ESS is low.

When a UPS is installed in a load having the maximum daily power consumption characteristics as shown in FIG. 2, the UPS has a capacity of 900 kW to meet the load of 900 kW in winter, but the ESS remains in standby until a power failure occurs, and the maximum power consumption is less than 500 kW in the period except winter, so the ESS output of 400 kW can be used for demand control.

Therefore, in order to increase the usability of the ESS, the ESS has recently been developed to be used for demand control before the occurrence of a power failure, so as to simultaneously perform a function of reducing a power rate and a peak load.

In order to simultaneously utilize the demand control function and the UPS function, the energy capacity of the ESS operating the UPS function in case of a power failure and the energy capacity of the ESS used for the demand control function should be allocated.

If this allocation is not properly made, the UPS function cannot be performed in case of a power failure, or even though the capacity of the available ESS remains, it cannot be utilized.

The currently developed ESS for both demand control and UPS is configured such that a user sets and manages the capacity of the ESS in half as the UPS functional capacity and the demand control capacity.

However, since the load continuously changes in the characteristics, allocating and setting capacity in advance does not have the advantage of performing demand control by utilizing available capacity depending on the load condition while performing the UPS function, and is no different from installing an ESS for UPS and an ESS for demand control, respectively.

Generally, the ESS with UPS function is installed in a power supply part of important power equipment such as computer equipment, and the capacity of load to be supplied when a power failure occurs can be easily calculated through the information such as a consumption pattern of the associated important power equipment.

However, in recent years, since the capacity that can be supplied by an ESS functioning as a UPS has increased, and the ESS is installed in a power supply part of a building unit such as a building, a shop, a laboratory, as the need for a reliable power supply has arisen, the capacity of the load that the ESS has to supply as the UPS function is difficult to estimate easily and the possibility of occurrence of error is also high.

Therefore, it is difficult to allocate the capacity of large capacity ESS by function.

Meanwhile, an ESS using a lithium ion battery, which has been actively spreading recently, is configured such that a battery management system measures a battery voltage to estimate the state of charge (SOC) of the battery.

The estimation of SOC includes some errors because it is calculated assuming various battery characteristics. Other than the lithium-ion battery, other ESS technologies also have errors in the estimation of SOC.

In the case of the ESS using a lithium ion battery, the capacity for charge/discharge is continuously reduced after performing a predetermined charge/discharge operation according to battery life characteristics. The charge/discharge capacity reduction is determined by the charge/discharge operating environment and history of the battery, but estimation of the capacity reduction according to this life also does not have high accuracy.

The foregoing is intended merely to aid in the understanding of the background of the present invention, and is not intended to mean that the present invention falls within the purview of the related art that is already known to those skilled in the art.

DISCLOSURE

Technical Problem

An object of the present invention is to provide a control method and a control system for an energy storage system having demand control and uninterrupted power supply functions, the control method and control system capable of allocating capacity according to demand control and UPS functions and operating the energy storage system accordingly by establishing and verifying a reasonable ESS operation plan.

Technical Solution

According to some aspect of the present invention, there is provided a control method for an energy storage system having demand control and uninterrupted power supply functions including: an operation plan establishment step of predicting power to be consumed in a load, so as to estimate a capacity of energy (UPS capacity) which needs to be charged in the energy storage system in order to provide uninterrupted power supply when a power failure occurs, and a capacity of energy available for demand control; an energy storage system operation step of operating the energy storage system according to an operation plan established in the operation plan establishment step; and an operation plan reestablishment step according to an operation state of the energy storage system operated by the energy storage system operation step.

In the operation plan establishment step, prediction of the power to be consumed in the load may be performed by a time series analysis of a power consumption record of the load.

Further, the operation plan establishment step may estimate a load prediction error correspondence capacity corresponding to an error in prediction of the power to be consumed in the load.

The load prediction error correspondence capacity may be set differently depending on characteristics of a predicted date.

Further, the operation plan establishment step may estimate a capacity reduction correspondence capacity according to life of the energy storage system.

The operation plan establishment step may estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control.

Further, when the capacity available for the demand control is estimated by the operation plan establishment step, a charge/discharge operation plan of the energy storage system may be established in consideration of the capacity available for the demand control, and efficiency and the state of charge of the energy storage system.

The charge/discharge operation plan of the energy storage system may be selectable as a charge/discharge operation for power rate reduction of the load or as a charge/discharge operation for peak load reduction of the load.

Meanwhile, the operation plan reestablishment step may compare the state of charge of the energy storage system operated by the energy storage system operation step with a state of charge estimated by the operation plan establishment step, and reestablish the operation plan based on the state of charge of the operated energy storage system when a difference is equal to or more than a predetermined value.

Alternatively, the operation plan reestablishment step may compare power consumption of the load in the energy storage system operation step with power to be consumed in a load predicted by the operation plan establishment step, and reestablish the operation plan based on the power consumption of the load when a difference is equal to or more than a predetermined value.

According to some aspect of the present invention, there is provided a control method for an energy storage system having demand control and uninterrupted power supply functions being configured to predict power to be consumed in a load to estimate a capacity of energy (UPS capacity) which needs to be charged in the energy storage system in order to provide uninterrupted power supply when a power failure occurs, estimate a load prediction error correspondence capacity corresponding to an error in prediction of the power to be consumed in the load, estimate a capacity reduction correspondence capacity according to life of the energy storage system, estimate a capacity corresponding to an estimation error in a state of charge of the energy storage system, and estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control, thereby establishing an operation plan of the energy storage system.

According to some aspect of the present invention, there is provided a control system for an energy storage system having demand control and uninterrupted power supply functions including: an energy storage system operation plan establishment unit configured to predict power to be consumed in a load using information of load history database, so as to estimate a capacity of energy (UPS capacity) which needs to be charged in the energy storage system in order to provide uninterrupted power supply when a power failure occurs, and a capacity of energy available for demand control; an energy storage system charge/discharge control unit configured to control charge/discharge of the energy storage system according to an operation plan established by the energy storage system operation plan establishment unit; and the energy storage system operation analysis unit configured to correct information according to operation state of the energy storage system operated by control of the energy storage system charge/discharge control unit.

The energy storage system operation plan establishment unit may predict power to be consumed in the load through a time series analysis of the power consumption record of the load.

Further, the energy storage system operation plan establishment unit may estimate a load prediction error correspondence capacity corresponding to an error in prediction of the power to be consumed in the load.

The load prediction error correspondence capacity may be set differently depending on characteristics of a predicted date.

Further, the energy storage system operation plan establishment unit may estimate a capacity reduction correspondence capacity according to life of the energy storage system.

The energy storage system operation plan establishment unit may estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control.

Meanwhile, when the capacity available for the demand control is estimated, the energy storage system operation plan establishment unit may establish a charge/discharge operation plan of the energy storage system in consideration of the capacity available for the demand control, and efficiency and the state of charge of the energy storage system.

Further, the charge/discharge operation plan of the energy storage system may be selectable as a charge/discharge operation for power rate reduction at the load or as a charge/discharge operation for peak load reduction at the load.

Further, the energy storage system operation analysis unit may compare the state of charge of the energy storage system operated by the energy storage system charge/discharge control unit with a state of charge estimated by the energy storage system operation plan establishment unit, and store the state of charge of the operated energy storage system in the load history database and reestablish an operation plan when a difference is equal to or more than a predetermined value.

Alternatively, the energy storage system operation analysis unit may compare power consumption of the load operated and controlled by the energy storage system charge/discharge control unit with power to be consumed in a load predicted by the energy storage system operation plan establishment unit, and store a load prediction difference in the load history database when the load prediction difference is equal to or more than a predetermined value.

According to some aspect of the present invention, there is provided a control system for an energy storage system having demand control and uninterrupted power supply functions being configured to predict power to be consumed in a load using information of load history database to estimate a capacity of energy (UPS capacity) which needs to be charged in the energy storage system in order to provide uninterrupted power supply when a power failure occurs, estimate a load prediction error correspondence capacity corresponding to an error in prediction of the power to be consumed in the load, estimate a capacity reduction correspondence capacity according to life of the energy storage system, estimate a capacity corresponding to an estimation error in a state of charge of the energy storage system, and estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control, thereby establishing an operation plan of the energy storage system.

Advantageous Effects

According to the control method and control system for an energy storage system having demand control and uninterrupted power supply functions of the present invention, it is possible to increase the economical efficiency of ESS by utilizing an unused capacity of an ESS for UPS to apply the same to demand control.

Further, it is possible to operate an ESS more reliably by ensuring countermeasures against the factors that cause errors in the capacity allocation calculation of the ESS for large capacity UPS.

Further, it is possible to increase the economical efficiency of ESS by adding demand control function to emergency generator.

In other words, since Korea's emergency generator is installed with about 21,000 MkW and the load ratio of the installed load is about 50%, when the emergency generator is converted into the ESS also for demand control according to the present invention, a demand control capacity of 1,800 GWh per year (assuming that an ESS of about 10,000 MW is operated for one hour per day for six months) is secured.

Briefly estimating the economics of demand control with SMP, the demand control capacity equivalent to 180 billion won per year is secured (assuming 100 won/kWh).

BEST MODE

Figure 1:
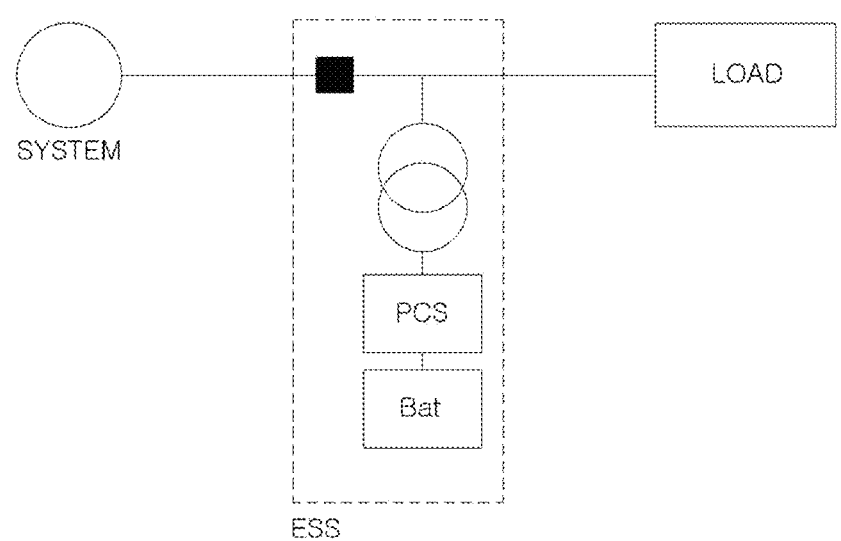
FIG. 1 shows a structure of a conventional ESS capable of simultaneously performing demand control and UPS functions.

In order to fully understand the present invention, the operational advantages of the present invention, and the objectives achieved by the practice of the present invention, reference should be made to the accompanying drawings, which illustrate preferred embodiments of the present invention, and the contents of the accompanying drawings.

In the following description of the present invention, detailed descriptions of known functions and components incorporated herein will be omitted when they may make the subject matter of the present invention unclear.

A control method and a control system for energy storage system having demand control and uninterrupted power supply functions of the present invention is a control method and a system that can rationally analyze and predict the characteristics of a load to establish an operation plan of an energy storage device (ESS) and overcome the error of the plan.

In other words, to perform both an uninterrupted power supply (UPS) function and a demand control function, it is a key technology to control charge/discharge by allocating capacity of the ESS for each function, and to achieve this, an operation plan is established considering all of load prediction that consumes power, an error of this prediction, an estimation error in a state of charge of the ESS, capacity reduction according to the life of the ESS, and the like, and real-time charge/discharge control is performed, whereby it is possible to successfully use both the UPS function and the demand control function.

Hereinbelow, the technical principle of the control method and control system for an energy storage system having demand control and uninterrupted power supply functions according to the present invention will be described, and more specific embodiments will be described later.

In order to use one energy storage system (ESS) as both a UPS function and a demand control function, the control method for an ESS includes: a step of establishing an operation plan; a step of performing charge/discharge control according to the operation plan and storing operation record; and a step of reestablishing the operation plan by analyzing the operation record and correcting the operation plan.

In the step of establishing an operation plan, a load prediction is performed in units of minutes or hours, up to a day or a week later so as to estimate an energy capacity to be charged to the ESS for uninterrupted power supply in the event of a power outage (hereinafter, referred to as UPS capacity).

The load prediction may be performed by a time series analysis of a power consumption record, and allocate a spare capacity of the ESS according to the load prediction to compensate for the load prediction error.

In other words, when a higher than expected load occurs, the spare capacity is allocated in preparation for the lack of capacity charged to the ESS to perform the UPS function.

The allocation of the spare capacity of the ESS in preparation for the error is set differently for each day, such as weekday and special days (holiday, etc.), so that the capacity of the ESS can be further utilized.

Further, the information about the load prediction error is recorded in the ESS operation performance database and reflected in the calculation of the ESS spare capacity in preparation for the load prediction error at predetermined intervals.

The state of charge of the ESS is performed through various calculation processes depending on the type of ESS.

In this calculation process, the error in preparation for the state of charge calculation error including the error of the technique for measuring the voltage and current of the ESS is also reflected in the operation plan of the ESS to allocate the capacity.

Further, the capacity reduction according to life of the ESS is subtracted from the entire capacity of the ESS and reflected in the operation plan.

Of the above described capacity of the ESS, excluding the UPS function capacity, the load prediction error correspondence capacity, the capacity reduction correspondence capacity according to life, and the state of charge calculation error, the remaining capacity is allocated as the capacity available for the demand control.

When allocation of the capacity of the ESS per unit time is completed, a step of establishing a charge/discharge operation plan of the ESS is performed in consideration of the demand control capacity.

The charge/discharge operation plan is established considering the efficiency and the state of charge of the ESS.

The purpose of charge/discharge operation of the ESS may be set by a user for the purpose of reducing the power rate, the purpose of reducing the maximum power consumption, or the like.

In the step of performing the operation of the ESS according to the operation plan, the difference between the state of charge measured in real-time state of charge and the state of charge estimated from the operation plan is calculated, and the operation plan is reestablished based on the measured state of charge when the difference is equal to or more than a predetermined value.

Further, in the step of performing the operation, when the difference between the measured power consumption of the load and the power consumption estimated by the load prediction difference is equal to or more than a predetermined value, the operation plan is reestablished by correcting the load prediction value.

Figure 3:
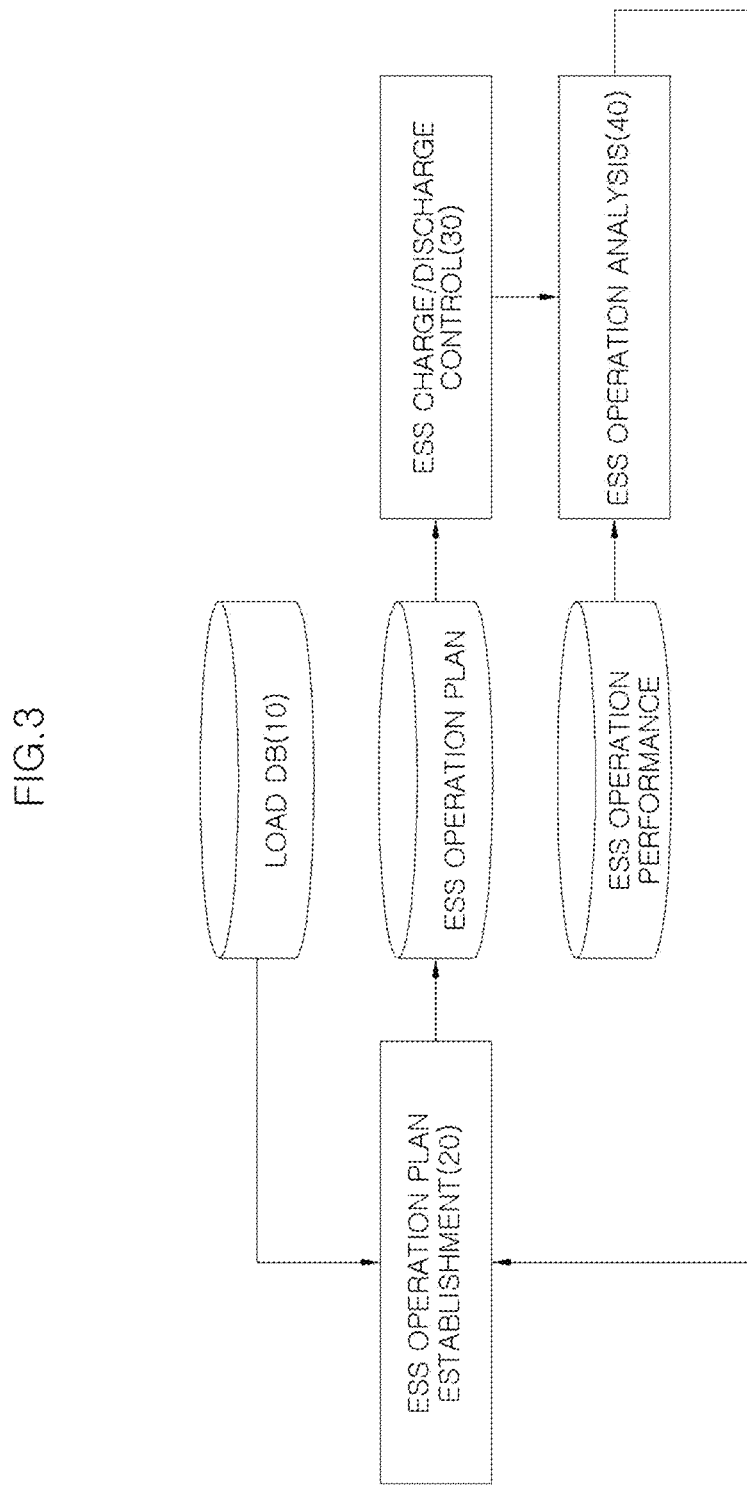
FIG. 3 shows a control system for an energy storage system having demand control and uninterrupted power supply functions according to an embodiment of the present invention.

FIG. 3 shows a control system for an energy storage system having demand control and uninterrupted power supply functions according to an embodiment of the present invention.

Figure 4:
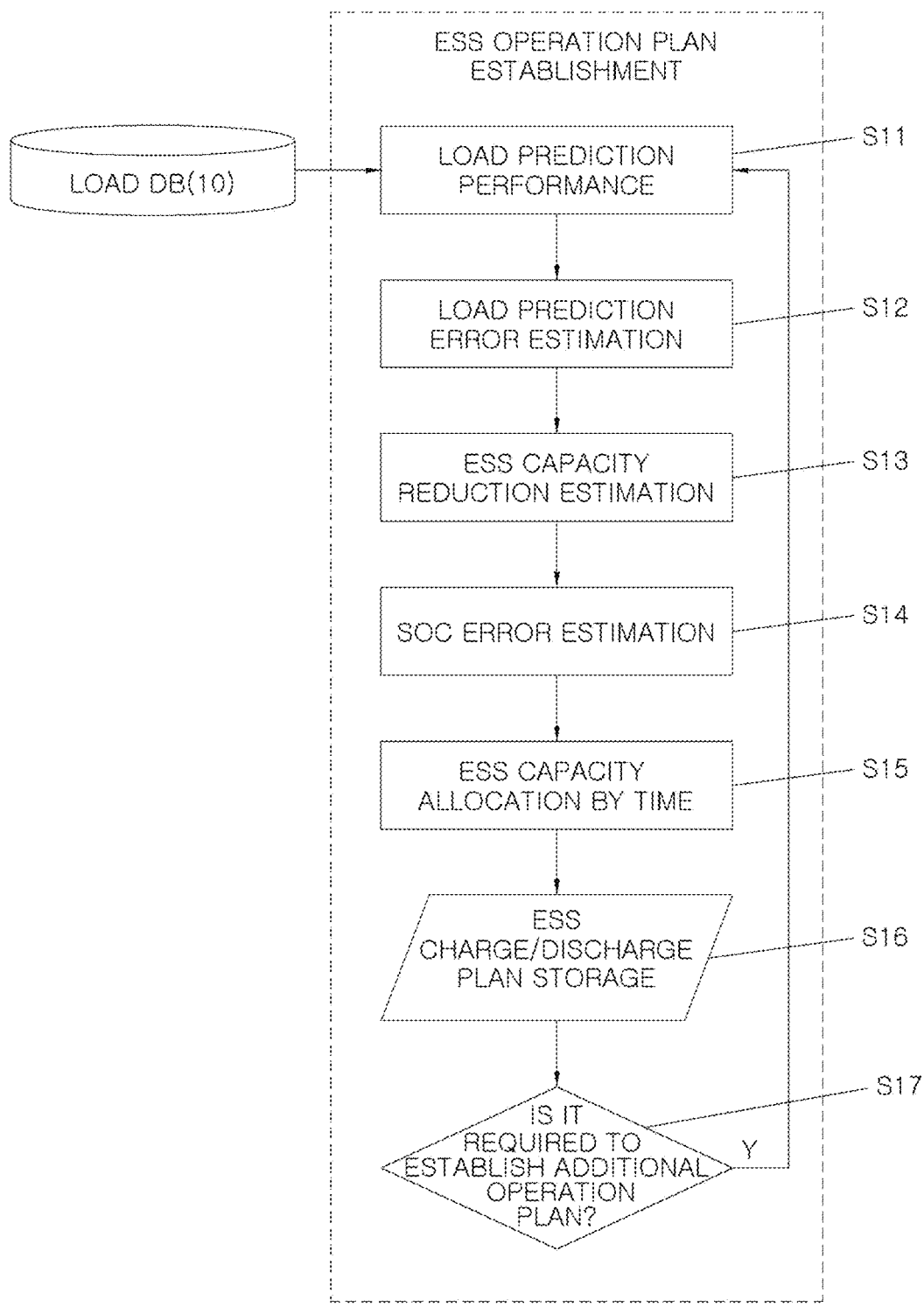
FIG. 4 shows a control method for an energy storage system having demand control and uninterrupted power supply functions according to an embodiment of the present invention.

FIG. 4 shows a control method for an energy storage system having demand control and uninterrupted power supply functions according to an embodiment of the present invention.

Hereinafter, a specific embodiment of the present invention will be described with reference to FIGS. 3 and 4.

The ESS control system for simultaneously utilizing demand control and uninterrupted power supply functions includes: an ESS operation plan establishment unit 20 configured to establish an operation plan for the ESS using information of load history database 10; a charge/discharge control unit 30 configured to control the ESS according to the operation plan; and an ESS operation analysis unit 40 configured to correct information used to establish the ESS operation plan by analyzing ESS operation performance.

The operation plan of the ESS is established one day before or one week before.

For example, when the operation plan is established one day before, in order to establish a tomorrow's ESS operation plan by unit time, load prediction is performed using the information of the load history database 10 (S11).

In the load prediction step (S11), to estimate a load prediction error, tomorrow is classified into a general day with low load prediction error, and a special day with high load prediction error to estimate the load prediction error (S12).

Figure 2:
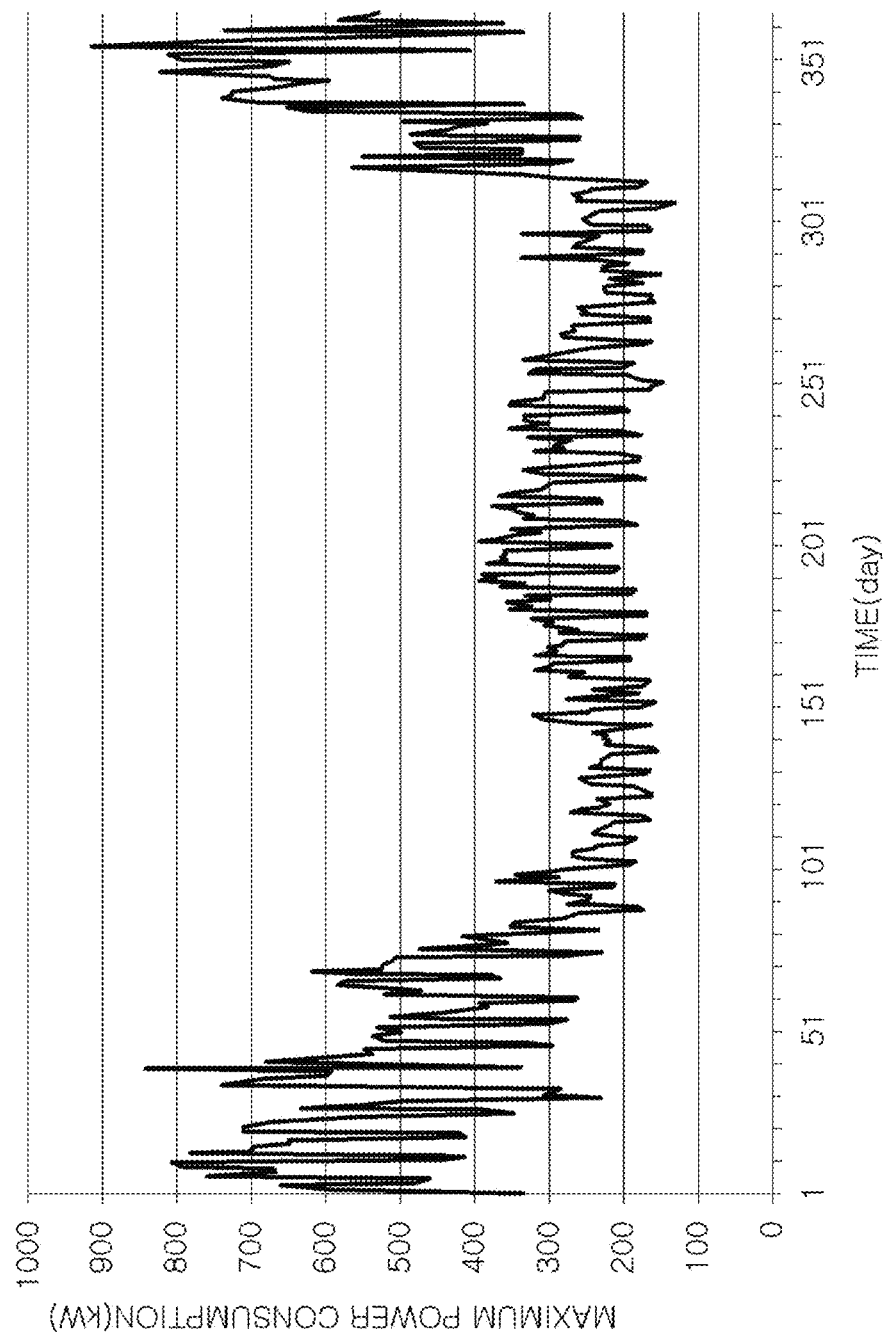
FIG. 2 shows an example of maximum daily power consumption of a predetermined load.

Taking a load having the maximum power consumption characteristic as an example as shown in FIG. 2, the load has characteristics in which power consumption exceeds about 900 kW in the winter.

Therefore, the ESS for performing the UPS function at this load must have a capacity greater than the maximum winter power (900 kW). Assuming that an ESS of 1 MW/1 MWh is installed, this ESS is less usable during periods other than winter.

The control method for an ESS having demand control and UPS functions with the load as an example will be described as follows.

Figure 5:
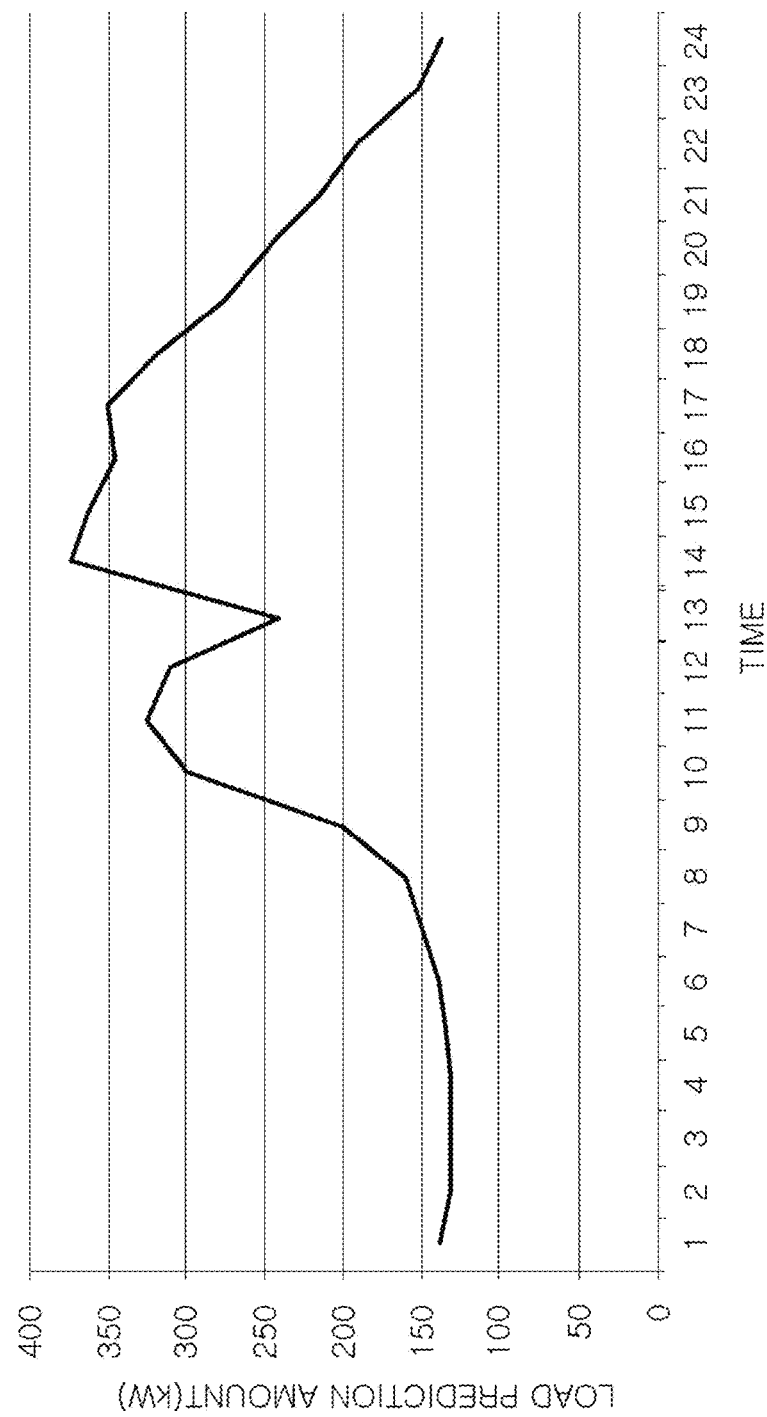
FIG. 5 shows a load prediction result according to the example of FIG. 2.

If load prediction is performed one day in the summer, the load of the next day can be estimated as shown in FIG. 5. When the load is estimated, the energy capacity of the ESS required at the time of the occurrence of the power failure is calculated. For example, if the energy capacity is calculated based on the ESS supplying power for 10 minutes (set by the operator) in the event of a power failure, the amount of energy required at the corresponding time is calculated by multiplying the estimated load (kW) for each hour by $10/60$ (16.67%).

Figure 6:
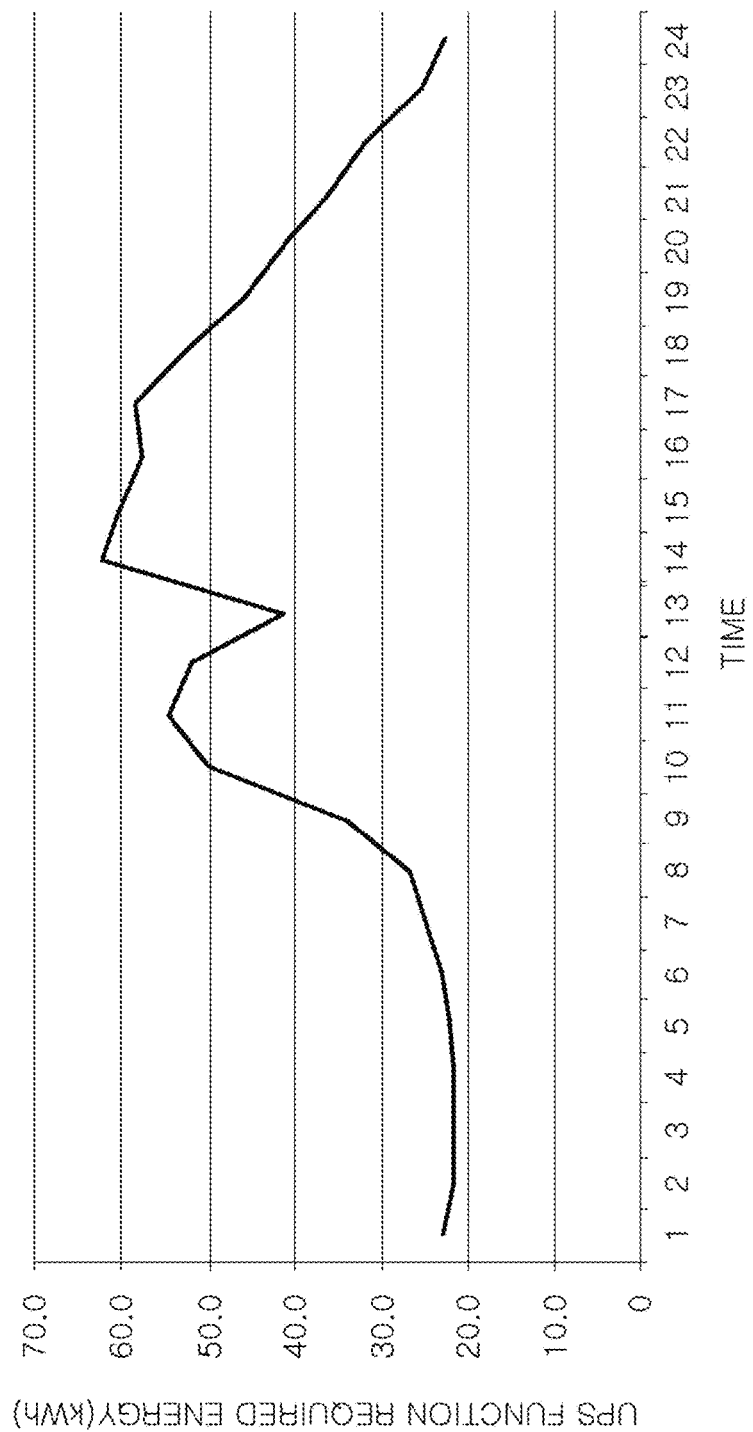
FIG. 6 shows an ESS capacity corresponding to the UPS function by time based on the load prediction of FIG. 5.

The energy (E_UPS) required for the ESS for the time-series UPS function is calculated as shown in FIG. 6 by reflecting the estimated load by time in FIG. 5. This capacity means the capacity that must be charged to the ESS to perform the UPS function at the corresponding time.

The ESS capacity is estimated to cope with the load prediction error using the predefined load prediction error value considering whether the load prediction day is a special day with a high load prediction error or not.

For example, if the day after predicting the load is general day, 10% is allocated to the ESS energy capacity corresponding to the UPS function allocated for each hour considering the load prediction error±5% as the capacity corresponding to the load prediction error (E_FCE).

In the next step, a decrease in the charge/discharge capacity due to the deterioration of the service life of the ESS is estimated (S13) and reflected in the ESS operation plan.

Reduced ESS capacity (E_DET) due to degradation may be estimated at the ESS facility or may be estimated through analysis of the operation performance database. For example, if it is estimated that the energy capacity is reduced by 1% of the entire ESS, 1% (10 kWh) of the initial installation capacity of the ESS is allocated as unusable, which is used to establish the ESS operation.

Next, the error of the ESS state of charge is reflected to the capacity allocation (S14). If estimation of the ESS state of charge has an error of up to ±3%, then a capacity of 6% for the ESS rated capacity is set as the capacity corresponding to the state of charge estimation error (E_SOCE).

Accordingly, excluding the capacity (E_UPS) to perform a UPS function at rated capacity of ESS, the load prediction error correspondence capacity (E_FCE), the capacity reduced due to degradation (E_DET), state of charge estimation error correspondence capacity (E_SOCE), the remaining capacity is allocated as demand control available capacity (E_DC) (S15).

$$E_{rated} - E_{UPS} - E_{FCE} - E_{DET} - E_{SOCE} = E_{DC}$$ [Equation 1]

Figure 7:
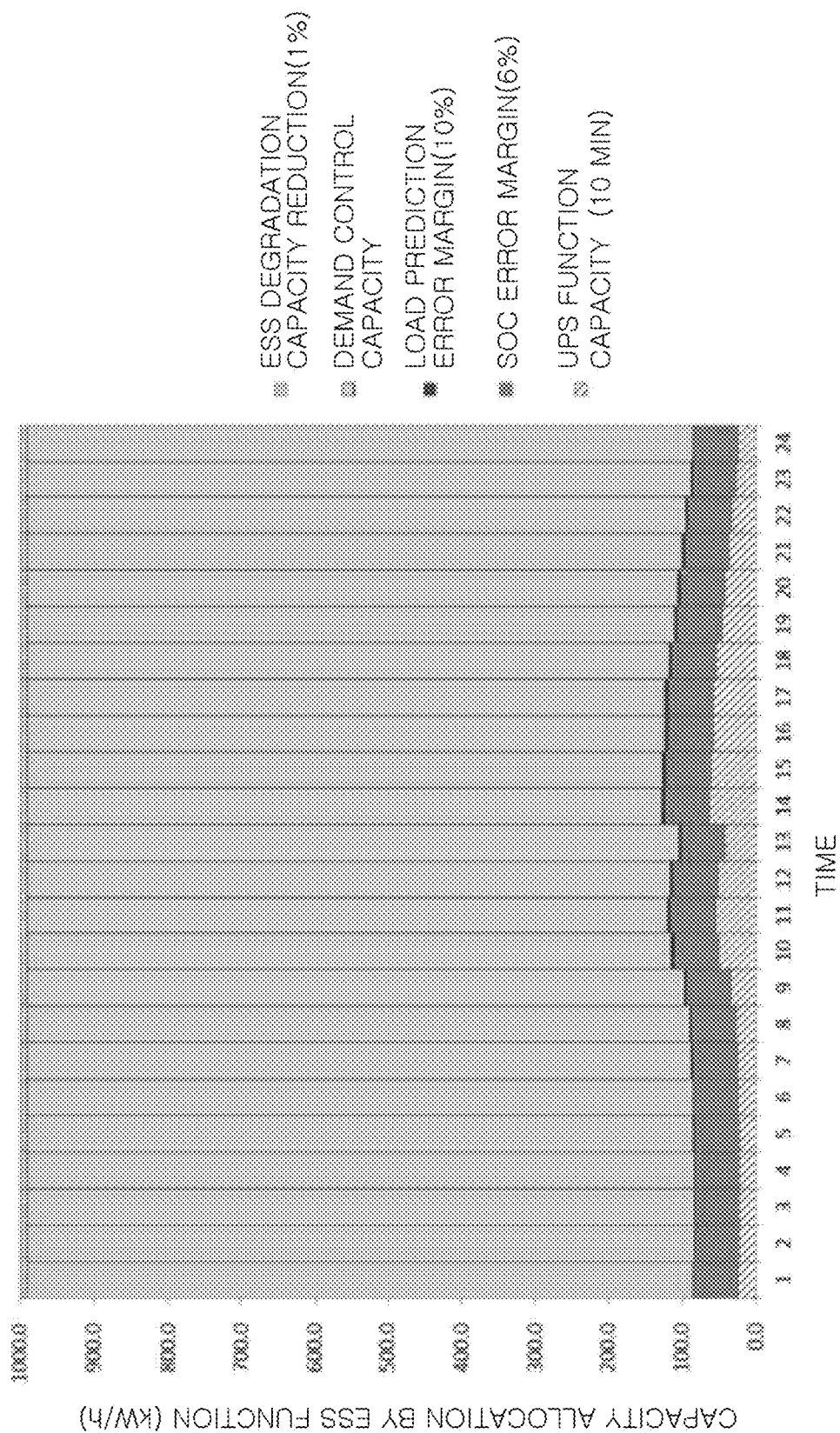
FIG. 7 shows an ESS allocation capacity by time based on the load prediction of FIG. 5.

The ESS capacity allocation by time calculated by this example is organized as shown in FIG. 7.

Finally, in the ESS operation plan establishment step, the charge/discharge operation plan of the ESS is established by checking the demand control available capacity by time, and is stored in the operation plan database (S16), and it is determined whether or not an operation plan should be additionally established (S17).

Figure 8:
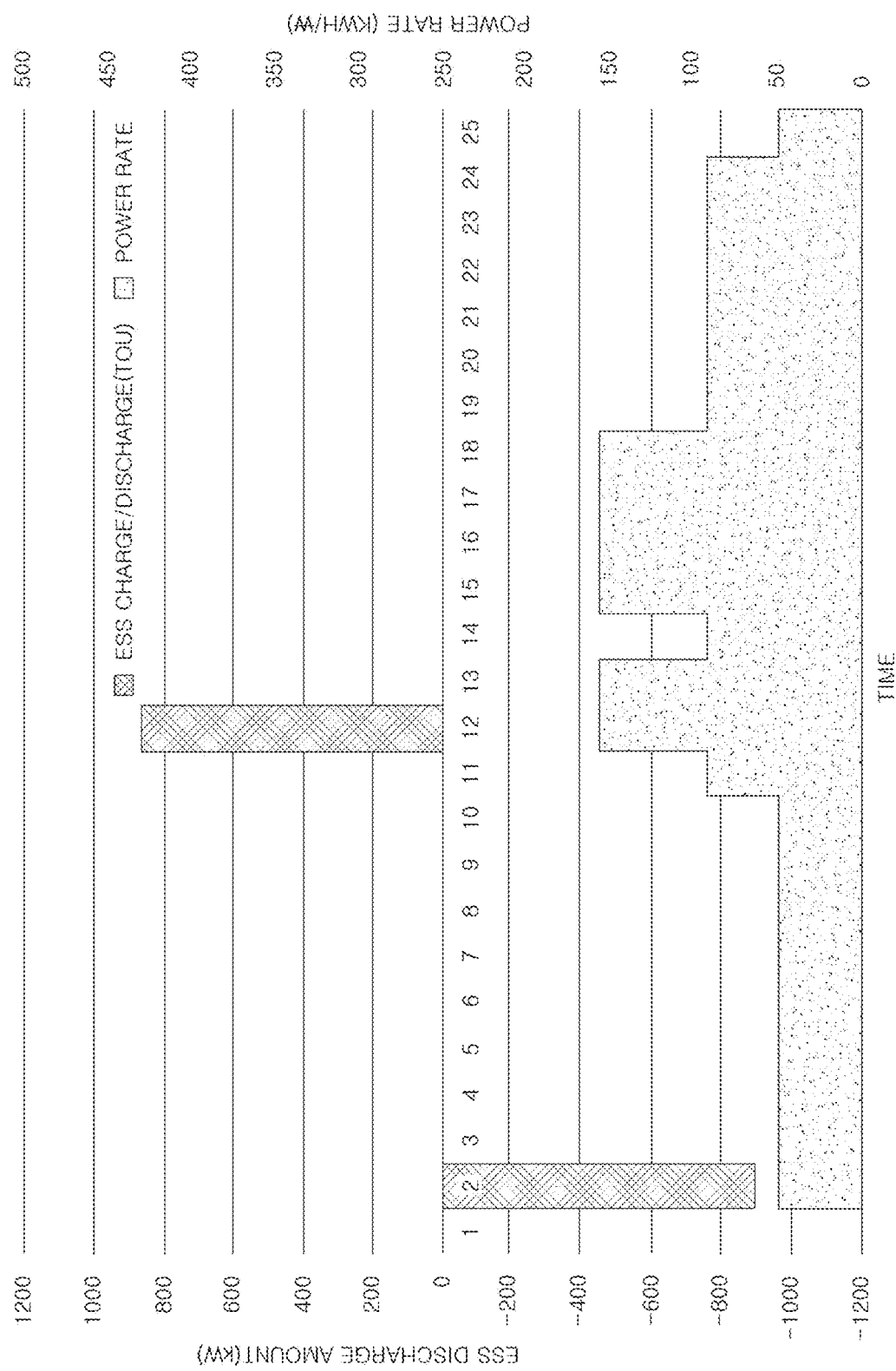
FIGS. 8 and 9 show examples of types of ESS charge/discharge plans.
Figure 9:
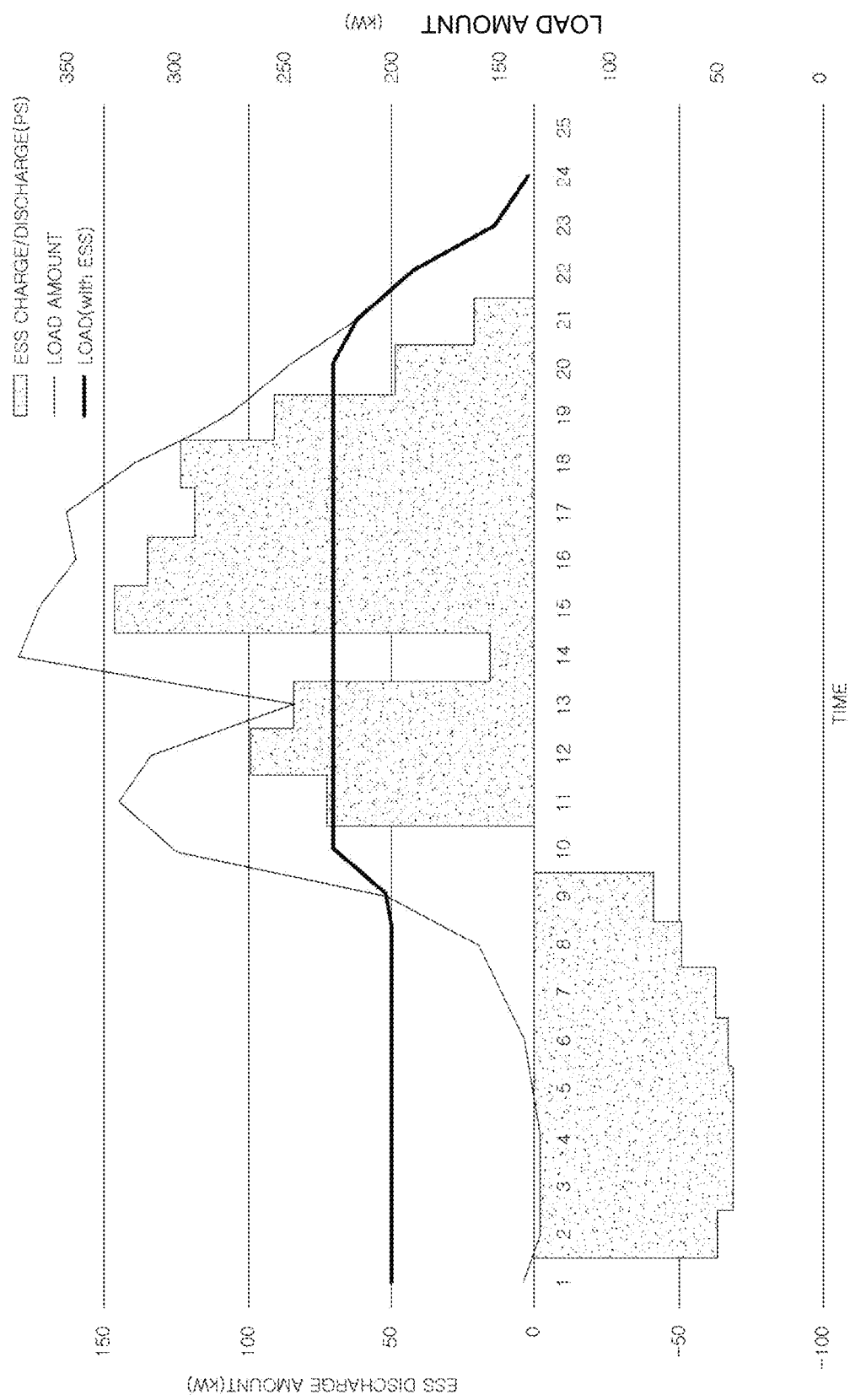

The charge/discharge plan of the ESS is selectively set as a charge/discharge operation for power rate reduction of the load as shown in FIG. 8 and as a charge/discharge operation for reducing peak load of the load as shown in FIG. 9.

Considering the efficiency of the ESS in the charge/discharge operation plan of the ESS, the charge/discharge plan is established by calculating the state of charge by unit time, and the efficiency used here is configured to be updateable at predetermined intervals.

Figure 10:
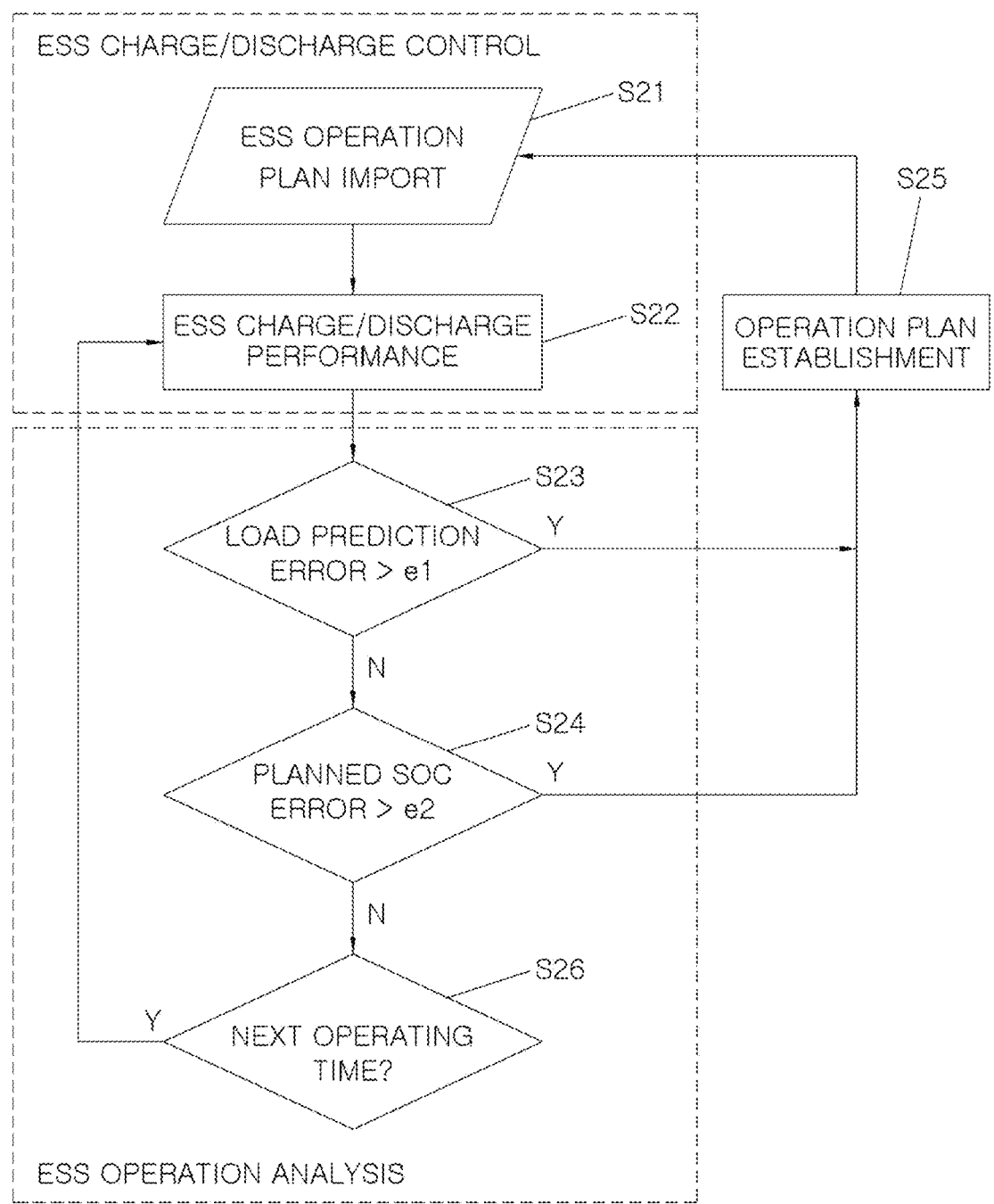
FIG. 10 shows ESS operation by the load prediction result according to an embodiment of the present invention.

Further, with the ESS operation plan stored in the database, as shown in FIG. 10, the ESS charge/discharge control unit 30 imports the operation plan from the database at the time of the ESS operation planning (S21) and transmits the operation plan to the ESS communication to perform the charge/discharge control (S22).

In the charge/discharge operation of the ESS, it is determined whether the current load has a difference of a predetermined value e1 or more from the predicted load used in establishing the ESS operation plan, when the difference is equal to or more than e1, the ESS operation analysis unit 40 performs the ESS operation plan establishment again based on the current load amount (S25) and stores it in the database.

Further, it is determined whether the difference between the value of the state of charge of the ESS estimated in the ESS charge/discharge plan and the value of the current state of charge is a predetermined magnitude e2 or more (S24), and when the difference is equal to or more than e2, the ESS operation analysis unit 40 reestablishes ESS operation plan (S25) based on the current state of charge and stores it in the database.

Further, the load prediction error and the SOC estimation error are continuously recorded in the operation performance database of the ESS to be used at predetermined intervals to estimate the ESS load prediction error value used in the ESS operation plan establishment unit 20, and the SOC estimation error is used to correct the ESS efficiency value in the process of establishing the charge/discharge plan in the ESS operation plan establishment unit 20, and the steps S22 and subsequent steps are performed again according to the determined period by the plan reestablished by the corrected information (S26).

The control method and control system for an energy storage system having demand control and uninterrupted power supply functions according to the present invention reasonably estimates and corrects the ESS charge amount to manage the ESS capacity by appropriately selecting demand control capacity and UPS capacity accordingly, whereby it is possible to use energy economically and efficiently.

Although the preferred embodiment of the present invention has been described disclosed with reference to the accompanying drawings, those who are ordinarily skilled in the art will appreciate that various alternatives, modifications, and equivalents are possible, without changing the spirit or essential features of the present invention. Accordingly, it should be understood that the modifications or variations are within the scope of the appended claims and that the scope of the present invention is construed on the basis of the appended claims.

DESCRIPTION OF REFERENCE CHARACTERS OF IMPORTANT PARTS

10: load history database
20: ESS operation plan establishment unit
30: ESS charge/discharge control unit
40: ESS operation analysis unit
S11: load prediction performance
S12: load prediction error estimation
S13: ESS capacity reduction estimation
S14: SOC error estimation
S15: ESS capacity allocation by time
S16: ESS charge/discharge plan storage
S17: additional operation plan establishment necessity determination
S21: ESS operation plan import
S22: ESS charge/discharge performance
S23: load prediction error determination
S24: planned SOC error determination
S25: additional operation plan establishment
S26: operation repetition at predetermined intervals

The invention claimed is:

1. A control method for an energy storage system having demand control and uninterrupted power supply functions, the control method comprising:
   an operation plan establishment step of predicting power to be consumed in a load, so as to estimate a capacity of energy (UPS capacity) which needs to be charged in the energy storage system in order to provide uninterrupted power supply when a power failure occurs, and a capacity of energy available for demand control;
   an energy storage system operation step of operating the energy storage system according to an operation plan established in the operation plan establishment step; and
   an operation plan reestablishment step according to an operation state of the energy storage system operated by the energy storage system operation step.

2. The control method of claim 1, wherein, in the operation plan establishment step, prediction of the power to be consumed in the load is performed by a time series analysis of a power consumption record of the load.

3. The control method of claim 2, wherein the operation plan establishment step estimates a load prediction error correspondence capacity corresponding to an error in prediction of the power to be consumed in the load.

4. The control method of claim 3, wherein the load prediction error correspondence capacity is set differently depending on characteristics of a predicted date.

5. The control method of claim 3, wherein the operation plan establishment step estimates a capacity reduction correspondence capacity according to the life of the energy storage system.

6. The control method of claim 5, wherein the operation plan establishment step estimates a capacity corresponding to an estimation error in a state of charge of the energy storage system.

7. The control method of claim 6, wherein the operation plan establishment step estimates a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control.

8. The control method of claim 7, wherein, when the capacity available for the demand control is estimated by the operation plan establishment step, a charge/discharge operation plan of the energy storage system is established in consideration of the capacity available for the demand control, and efficiency and the state of charge of the energy storage system.

9. The control method of claim 8, wherein the charge/discharge operation plan of the energy storage system is selectable as a charge/discharge operation for power rate reduction of the load or as a charge/discharge operation for peak load reduction of the load.

10. The control method of claim 8, wherein the operation plan reestablishment step compares the state of charge of the energy storage system operated by the energy storage system operation step with a state of charge estimated by the operation plan establishment step, and reestablishes the operation plan based on the state of charge of the operated energy storage system when a difference is equal to or more than a predetermined value.

11. The control method of claim 8, wherein the operation plan reestablishment step compares power consumption of the load in the energy storage system operation step with power to be consumed in a load predicted by the operation plan establishment step, and reestablishes the operation plan based on the power consumption of the load when a difference is equal to or more than a predetermined value.

12. A control method for an energy storage system having demand control and uninterrupted power supply functions, the control method being configured to predict power to be consumed in a load to estimate a capacity of energy (UPS capacity) which needs to be charged in the energy storage system in order to provide uninterrupted power supply when a power failure occurs, estimate a load prediction error correspondence capacity corresponding to an error in prediction of the power to be consumed in the load, estimate a capacity reduction correspondence capacity according to life of the energy storage system, estimate a capacity corresponding to an estimation error in a state of charge of the energy storage system, and estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control, thereby establishing an operation plan of the energy storage system.

13. A control system for an energy storage system having demand control and uninterrupted power supply functions, the control system comprising:
an energy storage system operation plan establishment unit configured to predict power to be consumed in a load using information of load history database, so as to estimate a capacity of energy (UPS capacity) which needs to be charged in the energy storage system in order to provide uninterrupted power supply when a power failure occurs, and a capacity of energy available for demand control;
an energy storage system charge/discharge control unit configured to control charge/discharge of the energy storage system according to an operation plan established by the energy storage system operation plan establishment unit; and
an energy storage system operation analysis unit configured to correct information according to an operation state of the energy storage system operated by the energy storage system charge/discharge control unit.

14. The control system of claim 13, wherein the energy storage system operation plan establishment unit predicts power to be consumed in the load through a time series analysis of the power consumption record of the load.

15. The control system of claim 14, wherein the energy storage system operation plan establishment unit estimates a load prediction error correspondence capacity corresponding to an error in prediction of the power to be consumed in the load.

16. The control system of claim 15, wherein the load prediction error correspondence capacity is set differently depending on characteristics of a predicted date.

17. The control system of claim 15, wherein the energy storage system operation plan establishment unit estimates a capacity reduction correspondence capacity according to the life of the energy storage system.

18. The control system of claim 17, wherein the energy storage system operation plan establishment unit estimates a capacity corresponding to an estimation error in a state of charge of the energy storage system.

19. The control system of claim 18, wherein the energy storage system operation plan establishment unit estimates a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control.

20. The control system of claim 19, wherein, when the capacity available for the demand control is estimated, the energy storage system operation plan establishment unit establishes a charge/discharge operation plan of the energy storage system in consideration of the capacity available for the demand control, and efficiency and the state of charge of the energy storage system.

21. The control system of claim 20, wherein the charge/discharge operation plan of the energy storage system is selectable as a charge/discharge operation for power rate reduction at the load or as a charge/discharge operation for peak load reduction at the load.

22. The control system of claim 20, wherein the energy storage system operation analysis unit compares the state of charge of the energy storage system operated by the energy storage system charge/discharge control unit with a state of charge estimated by the energy storage system operation plan establishment unit, and stores the state of charge of the operated energy storage system in the load history database and reestablishes an operation plan when a difference is equal to or more than a predetermined value.

23. The control system of claim 20, wherein the energy storage system operation analysis unit compares power consumption of the load operated and controlled by the energy storage system charge/discharge control unit with power to be consumed in a load predicted by the energy storage system operation plan establishment unit, and stores a load prediction difference in the load history database when the load prediction difference is equal to or more than a predetermined value.

24. A control system for an energy storage system having demand control and uninterrupted power supply functions, the control system being configured to predict power to be consumed in a load using information of load history database to estimate a capacity of energy (UPS capacity) which needs to be charged in the energy storage system in order to provide uninterrupted power supply when a power failure occurs, estimate a load prediction error correspondence capacity corresponding to an error in prediction of the power to be consumed in the load, estimate a capacity reduction correspondence capacity according to life of the energy storage system, estimate a capacity corresponding to an estimation error in a state of charge of the energy storage system, and estimate a capacity excluding the UPS capacity estimated from a rated capacity of the energy storage system, the load prediction error correspondence capacity, the capacity reduction correspondence capacity, and the correspondence capacity to error in the state of charge, as a capacity available for the demand control, thereby establishing an operation plan of the energy storage system.

* * * * *